(12) United States Patent
Tsubouchi

(10) Patent No.: US 7,068,322 B2
(45) Date of Patent: Jun. 27, 2006

(54) BROADCASTING RECEIVER

(75) Inventor: Akinori Tsubouchi, Hyogo (JP)

(73) Assignee: Sanyo Electric Co., Ltd., Osak (JP)

( * ) Notice: Subject to any disclaimer, the term of this patent is extended or adjusted under 35 U.S.C. 154(b) by 603 days.

(21) Appl. No.: 10/454,578

(22) Filed: Jun. 5, 2003

(65) Prior Publication Data

US 2003/0227576 A1   Dec. 11, 2003

(30) Foreign Application Priority Data

Jun. 7, 2002   (JP)   ............... 2002-166882

(51) Int. Cl.
*H04N 5/60* (2006.01)
*H04N 5/50* (2006.01)

(52) U.S. Cl. .................. 348/485; 348/738; 348/484; 348/481; 348/569; 348/729; 386/97; 381/2

(58) Field of Classification Search ............ 348/485, 348/738, 729, 725, 569, 481, 483, 484, 462, 348/553; 386/96, 97, 99, 104; 455/151.1, 455/160.1, 185.1; 381/2, 306, 307, 11, 12; 725/38, 18
See application file for complete search history.

(56) References Cited

U.S. PATENT DOCUMENTS

| | | | | |
|---|---|---|---|---|
| 5,144,439 A | * | 9/1992 | Wignot | 348/729 |
| 5,148,280 A | * | 9/1992 | Wignot et al. | 348/729 |
| 5,774,187 A | * | 6/1998 | Tsunoda | 348/553 |
| 5,781,247 A | * | 7/1998 | Wehmeyer et al. | 348/569 |
| 5,956,093 A | * | 9/1999 | Yang | 348/554 |
| 6,552,753 B1 | * | 4/2003 | Zhurbinskiy et al. | 348/738 |
| 6,694,091 B1 | * | 2/2004 | Moon et al. | 386/96 |
| 6,795,130 B1 | * | 9/2004 | Shibamiya | 348/734 |
| 6,801,261 B1 | * | 10/2004 | Haynes | 348/553 |
| 6,804,510 B1 | * | 10/2004 | Bates et al. | 455/414.4 |
| 6,813,281 B1 | * | 11/2004 | Moon et al. | 370/486 |
| 6,829,018 B1 | * | 12/2004 | Lin et al. | 348/738 |
| 6,888,576 B1 | * | 5/2005 | Takagi et al. | 348/569 |
| 6,927,802 B1 | * | 8/2005 | Kellner et al. | 348/485 |
| 6,940,563 B1 | * | 9/2005 | Ishihara | 348/738 |
| 6,943,845 B1 | * | 9/2005 | Mizutome et al. | 348/555 |
| 2001/0005445 A1 | * | 6/2001 | Nitta et al. | 386/75 |
| 2002/0067437 A1 | * | 6/2002 | Tsubouchi et al. | 348/725 |

FOREIGN PATENT DOCUMENTS

JP   11-98434   4/1999

* cited by examiner

*Primary Examiner*—David Ometz
*Assistant Examiner*—Jean W. Désir
(74) *Attorney, Agent, or Firm*—Westerman, Hattori, Daniels & Adrian, LLP

(57) ABSTRACT

A remote control transmitter is provided with an AUDIO key for switching an audio mode in sound multiplex broadcasting and an ENTER key for determining various types of selections. When the ENTER key is operated in a state where the audio mode is temporarily selected by operating the AUDIO key, the state where the audio mode is temporarily selected is treated as the steady selection corresponding to setting on a menu screen.

4 Claims, 6 Drawing Sheets

BROADCASTING RECEIVER

BACKGROUND OF THE INVENTION

Field of the Invention

The present invention relates to a broadcasting receiver that receives an analog broadcasting wave and a digital broadcasting wave and outputs at least an audio.

In recent television broadcasting receivers, the display of a menu screen for performing various types of setting is realized using an OSD (On-Screen Display) circuit. On the menu screen, various types of set items are displayed. One of the set items is an item for determining which of audio modes in sound multiplex broadcasting should be steadily utilized. A user selects any one of STEREO, SAP (Separate Audio Program), and MONO on the set item if the broadcasting receiver is an analog broadcasting receiver, while selecting any one of MAIN, SUB-1, SUB-2, . . . on the set item if the broadcasting receiver is a digital broadcasting receiver. On the other hand, a remote control transmitter in the broadcasting receiver is provided with a key for switching the audio mode in sound multiplex broadcasting. The audio mode can be switched by pressing the key. However, a state where the audio mode is switched is made temporary. If a channel is changed, and TV is turned off, the switched audio mode is returned to the above-mentioned steady audio mode by the menu setting.

In the above-mentioned conventional configuration, in order to change the steady audio mode, the menu screen must be called and set again. However, the number of menu items has been significantly increased in recent years. It takes long to reach the desired set item, which is not so convenient in use.

SUMMARY OF THE INVENTION

In view of the foregoing circumstances, an object of the present invention is to provide a broadcasting receiver that can perform temporarily audio mode setting and steady audio mode setting by a simple operation.

In order to solve the above-mentioned problem, in a broadcasting receiver that receives a broadcasting wave and outputs at least an audio, a broadcasting receiver according to the present invention is characterized by comprising a first key for switching an audio mode in sound multiplex broadcasting and a second key for determining various types of selections, a state where the audio mode is temporarily selected being treated as the steady selection corresponding to setting on a menu screen when the second key is operated in a state where the audio mode is temporarily selected by an operation of the first key.

In the above-mentioned configuration, the temporary audio mode setting and the steady audio mode setting can be performed only by operating the first key and the second key without calling the menu screen.

The broadcasting receiver may be so configured that when the second key is operated within a predetermined time period after the first key is operated, the state where the audio mode is temporarily selected is treated as the steady selection corresponding to the setting on the menu screen.

The broadcasting receiver may further comprise a digital broadcasting video generator for extracting a transport stream from a digital broadcasting wave and decoding the extracted transport stream, and an analog broadcasting video generator for outputting a signal demodulated from an analog broadcasting wave, the first key and the second key being shared between the time of receiving digital broadcasting and the time of receiving analog broadcasting.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described on the basis of FIGS. 1 to 6.

Figure 1:
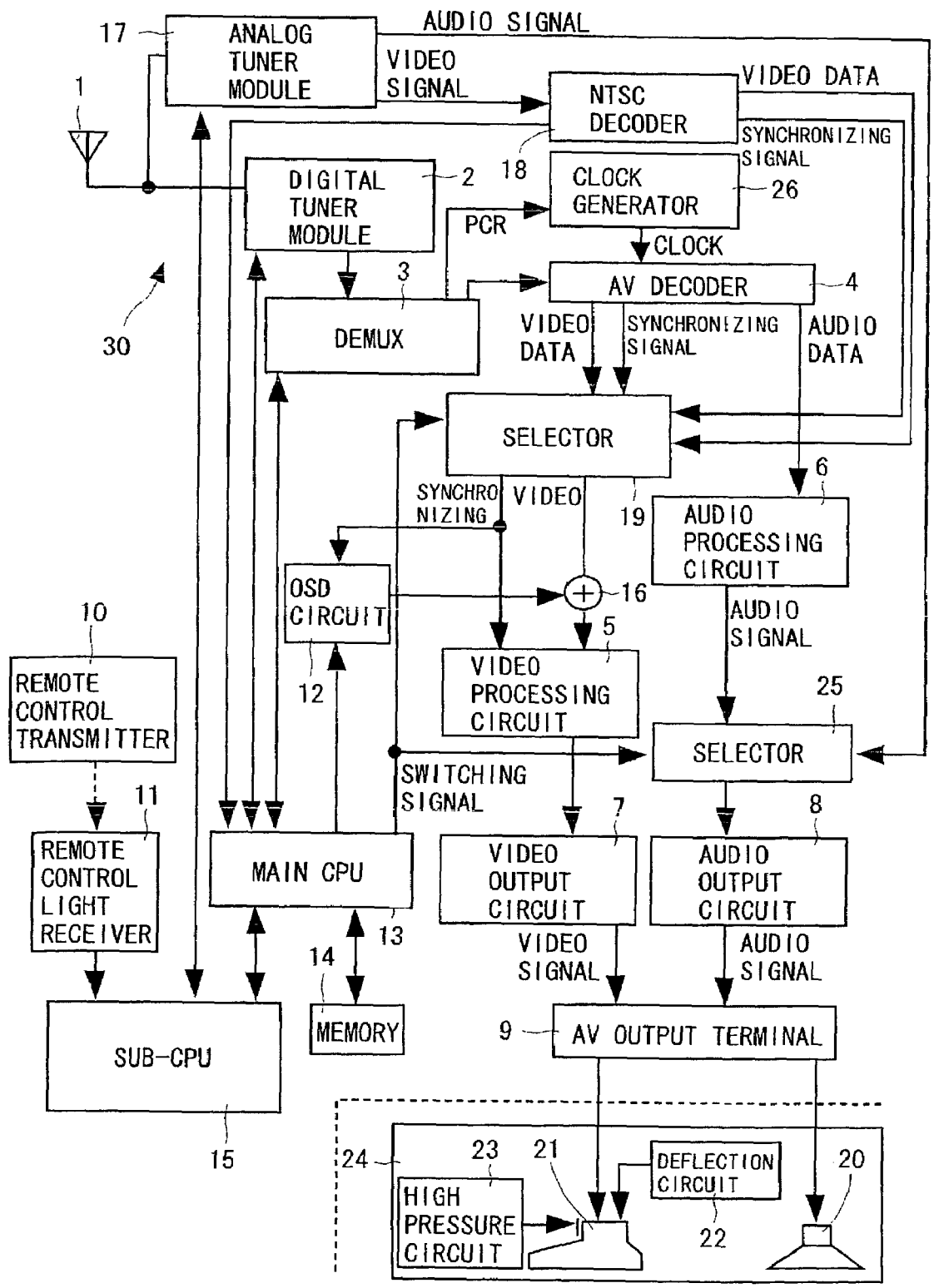
FIG. 1 is a block diagram showing a broadcasting receiver 30 according to the present embodiment that can view both terrestrial wave digital broadcasting and terrestrial wave analog broadcasting.
Figure 2:
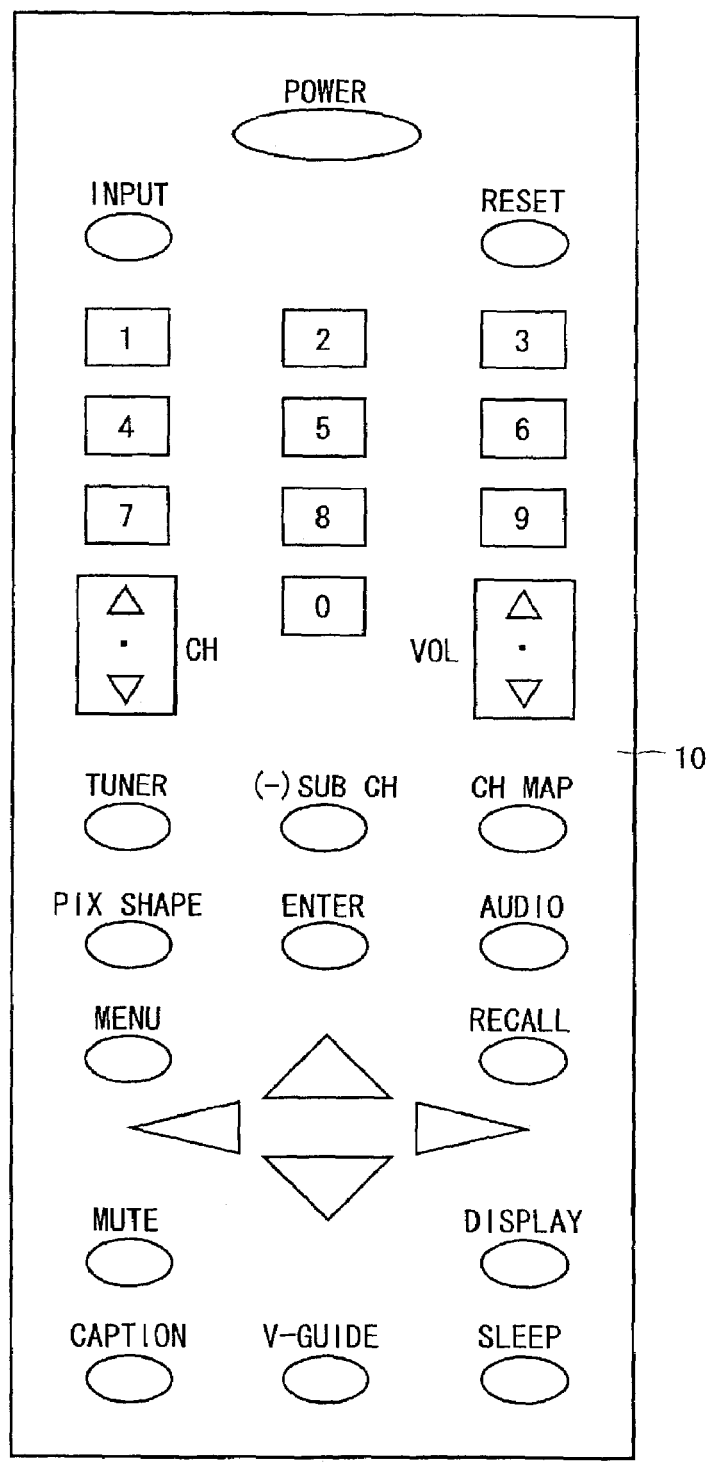
FIG. 2 is a plan view showing the appearance of a remote control transmitter.

In FIG. 1, an antenna 1 is arranged in a predetermined direction outdoors, and receives a terrestrial broadcasting wave sent from a terrestrial wave broadcasting station.

A digital tuner module (used for ATSC (Advanced TV System Committee) and receiving an air wave in the present embodiment) 2 extracts, out of high-frequency digital modulation signals including video/audio data, the digital modulation signal having a particular frequency. Further, the digital tuner module 2 comprises an inverse interleave circuit, an error correcting circuit, and so on, to demodulate the selected digital modulation signal and output a transport stream.

A demultiplexer (DEMUX) 3 separates and decodes the transport stream into a video stream and an audio stream based on MPEG2 (Moving Picture Experts Group2) PSI/SI (Program Specific Information/Service Information), and so on. The demultiplexer 3 supplies the video stream and the audio stream to an AV decoder 4, and supplies the PSI/SI to a main CPU 13. In the audio stream, one or a plurality of audios PES (Packetized Elementary Stream) to be sub-audios may exist in addition to an audio PES to be a main audio. Determination which of the audios PES should be extracted is made by a command from the main CPU 13. A plurality of channels are multiplexed on the transport stream, as described above. Processing for selecting any one of the plurality of channels can be performed by extracting from the PSI/SI data indicating which packet ID in the transport stream is used to multiplex the arbitrary channel. Further, the transport stream can be selected on the basis of the PSI/SI.

The demultiplexer 3 separates a program clock reference value (PCR: Program Clock Reference) from the transport stream, and feeds the separated program clock standard reference value to a clock generator 26. The clock generator 26 generates a reference clock (27 MHz) required to decode a video on the basis of the PCR.

The AV decoder 4 comprises a video decoder for decoding the video stream and an audio decoder for decoding the audio stream. The video decoder decodes an inputted variable length code to find a quantization factor and a motion vector, thereby carrying out inverse DCT (Discrete Cosine Transformation) conversion and motion compensation control based on the motion vector, for example. The audio decoder decodes an inputted coded signal (a main audio or one of one or more sub-audios) to generate audio data.

A selector 19 selects either one of video data (including its synchronizing signal) based on digital broadcasting outputted from the AV decoder 4 and video data (including its synchronizing signal) based on analog broadcasting outputted from an NTSC decoder 18, and feeds the selected video data to a video processing circuit 5. On the other hand, a selector 25 is used for an analog signal, selects either an analog audio signal outputted from an audio signal processing circuit 6 or an analog audio signal outputted from an analog tuner module 17, and feeds the selected analog audio signal to an audio output circuit 8.

The video processing circuit 5 receives the video data and the synchronizing signal, and subjects the received video data and synchronizing signal to digital-to-analog (D/A) conversion, to generate a video signal (a composite signal, a component signal, etc.), and feeds the video signal to a video output circuit 7. The audio processing circuit 6 receives the audio data outputted from the AV decoder 4, and subjects the received audio data to digital-to-analog (D/A) conversion, to generate an analog audio signal.

Each of the video output circuit 7 and the audio output circuit 8 comprises an output resistor, an amplifier, and so on. An AV output terminal 9 is provided with an output unit (a set of a right and left audio output terminal and a video output terminal). A monitor 24 connected to the AV output terminal 9 comprises an image receiving unit, comprising a deflection circuit 22 and a high pressure circuit 23, for driving a CRT (Cathode Ray Tube) 21, a speaker 20, and so on.

The analog tuner module (used for NTSC (National Television System Committee) in the present embodiment) 17 performs channel selection processing for selecting a signal having a frequency corresponding to the channel selected by the user and processing for demodulating the selected signal, for example, to generate an analog video signal and an analog audio signal. As to the analog audio signal, MONO, STEREO, and SAP may, in some cases be prepared, as already known. The user can arbitrarily select any one of them.

The NTSC decoder 18 comprises an A/D conversion circuit, and so on, and digitizes the analog video signal received from the analog tuner module 17, generates video data in the same format as that of the video data outputted by the AV decoder 4 as well as a synchronizing signal, and feeds the generated video data and synchronizing signal to the selector 19.

An OSD (On-Screen Display) circuit 12 outputs to an adder 16 bit map data based on character information which it is instructed to output from the main CPU 13. The adder 16 performs processing for incorporating the bit map data into the video data outputted from the selector 19. By the OSD circuit 12, a menu screen, an operation guide screen, etc. can be displayed.

The main CPU 13 carries out control of a channel selection command to the digital tuner module 2, an existent channel search, etc., control of write/read of initial audio mode setting information and OSD display data to/from a memory (EEPROM (Electrically Erasable and Programmable ROM), etc.) 14, control of the demultiplexer 3, and control of the AV decoder 4, control of the OSD circuit 12, a switching command to the selectors 19 and 25, and communication with a sub CPU 15, described later, for example. Although processing related to the switching of the audio mode according to the present invention is performed, the processing will be described in detail later.

A remote control transmitter 10 is a transmitter for sending out a command to a broadcasting receiver 30. The remote control transmitter 10 comprises various types of keys, as shown in an external view of FIG. 2. When such a key is operated, signal light (a remote control signal) meaning a command corresponding to the key is sent out from a light emitter (not shown). A remote control light receiver 11 receives the signal light, converts the received signal light into an electric signal, and feeds the electric signal to the sub CPU 15.

The sub CPU 15 performs processing for inputting the remote control signal by the remote control transmitter 10 and a control signal generated by a key operation of an operation unit (not shown) to notify the main CPU 13 of the signals and control of the analog tuner module 17.

When the contents of the operation for the remote control transmitter 10 or the like are related to analog broadcasting, the main CPU 13 knows the contents of the operation by the above-mentioned notification, to make the sub CPU 15 perform processing required.

Figure 3:
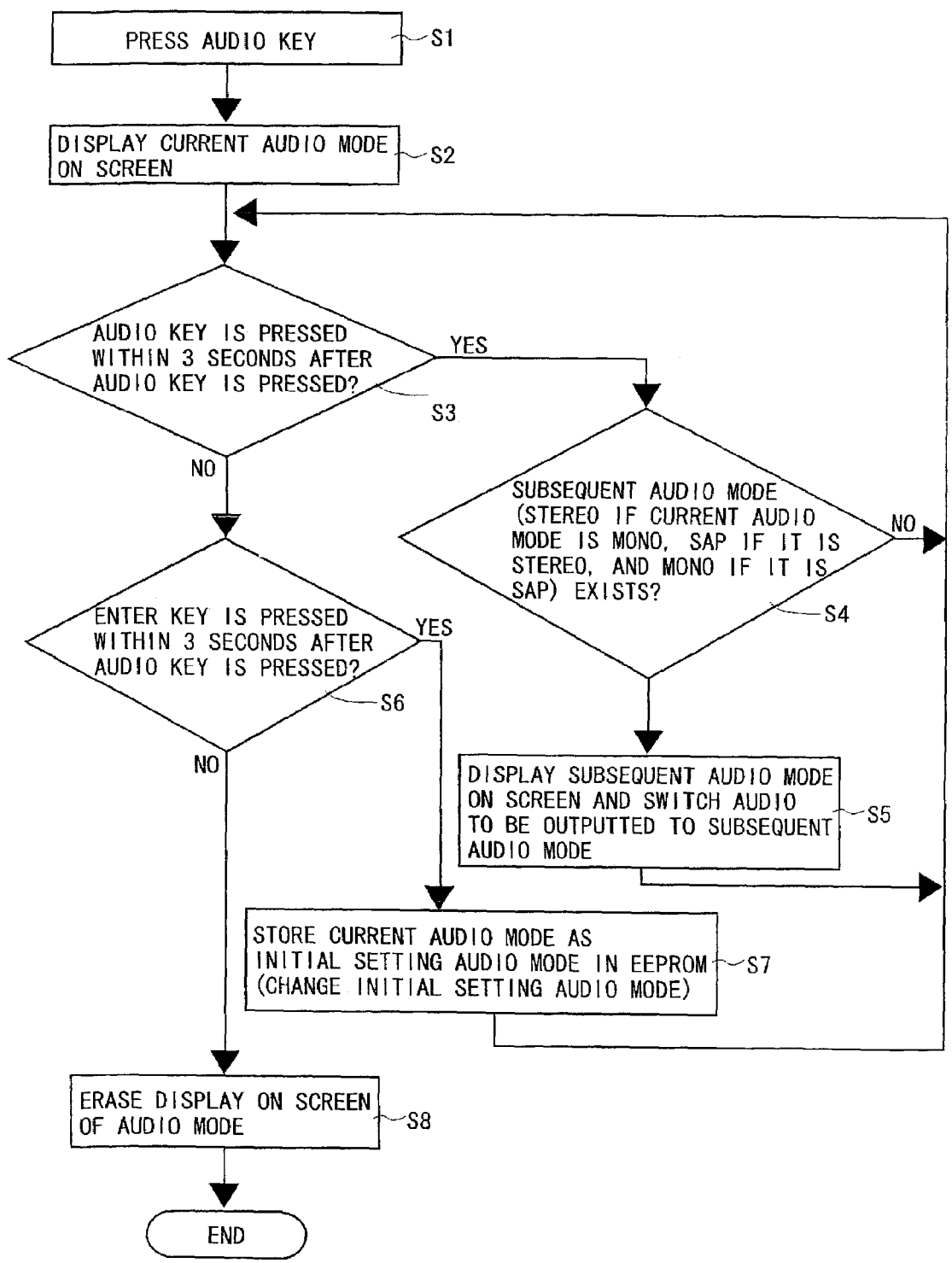
FIG. 3 is a flow chart showing processing for changing an audio mode at the time of receiving analog broadcasting.
Figure 4:
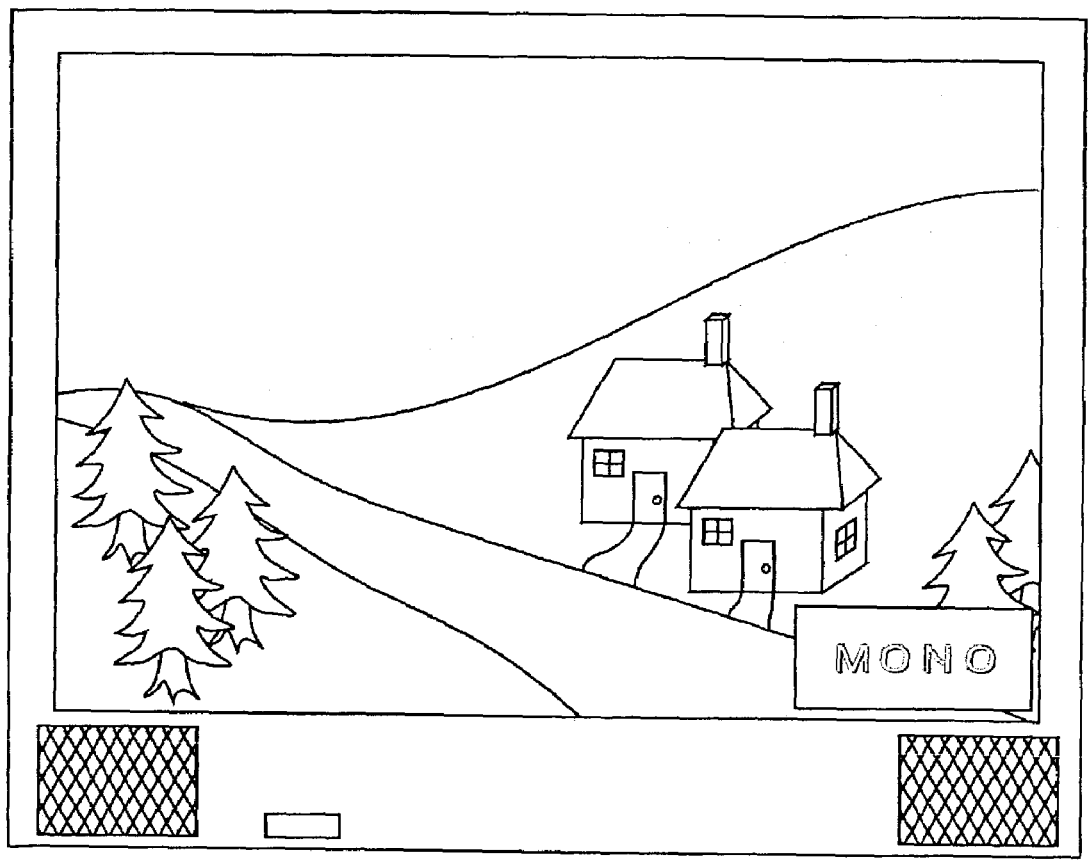
FIG. 4 is an illustration showing the display on a screen of an audio mode at the time of receiving analog broadcasting.

FIG. 3 is a flow chart showing audio mode switching processing performed by the CPUs 13 and 15 when analog broadcasting is received. When an AUDIO key in the remote control transmitter 10 is pressed by the user (step S1), the current audio mode is displayed on the screen using the OSD circuit 12 (step S2). The displayed state is illustrated in FIG. 4, for example. When the AUDIO key is pressed again within three seconds after the AUDIO key is pressed (YES in step S3), the existence of the subsequent audio mode is judged circularly such that STEREO is selected if the current audio mode is MONO, SAP is selected if it is STEREO, and MONO is selected if it is SAP (step S4).

If there is no subsequent audio mode (that is, when the number of audio modes is one) (NO in step S4), the state where the audio mode is displayed is maintained (returned to step S3). On the other hand, when the subsequent audio mode exists (YES in step S4), the subsequent audio mode is displayed on the screen, and an audio to be outputted is switched to the subsequent audio mode (step S5). The program is then returned to the step S3.

When the answer is in the negative in the step S3, it is judged whether or not an ENTER key is pressed within three seconds after the AUDIO key is pressed (step S6). When the ENTER key is pressed (YES in step S6), the current audio mode is stored in the memory 14 as an initial setting audio mode (as a steady selection corresponding to setting on the menu screen) (step S7). The program is returned to the step S3. On the other hand, when the ENTER key is not pressed (NO in step S6), the display on the screen of the audio mode is erased (step S8), after which the program ends.

When the state where the audio mode is selected is determined through the step S7, the audio mode is treated as a steady audio mode. Even if the channel is changed, and TV is turned off, the basic mode is the audio mode. If the AUDIO key is operated by the user, a state where the audio mode is temporarily changed is formed while making the audio mode basic.

In a state where STEREO and SAP are temporarily or steadily selected as the audio mode, the program is changed (the channel is changed). When it is assumed that there are no STEREO and SAP in the program, the audio mode is automatically switched to MONO. Further, when the program is switched to a program provided with STEREO and SAP again, processing for making STEREO and SAP effective may be performed.

Figure 5:
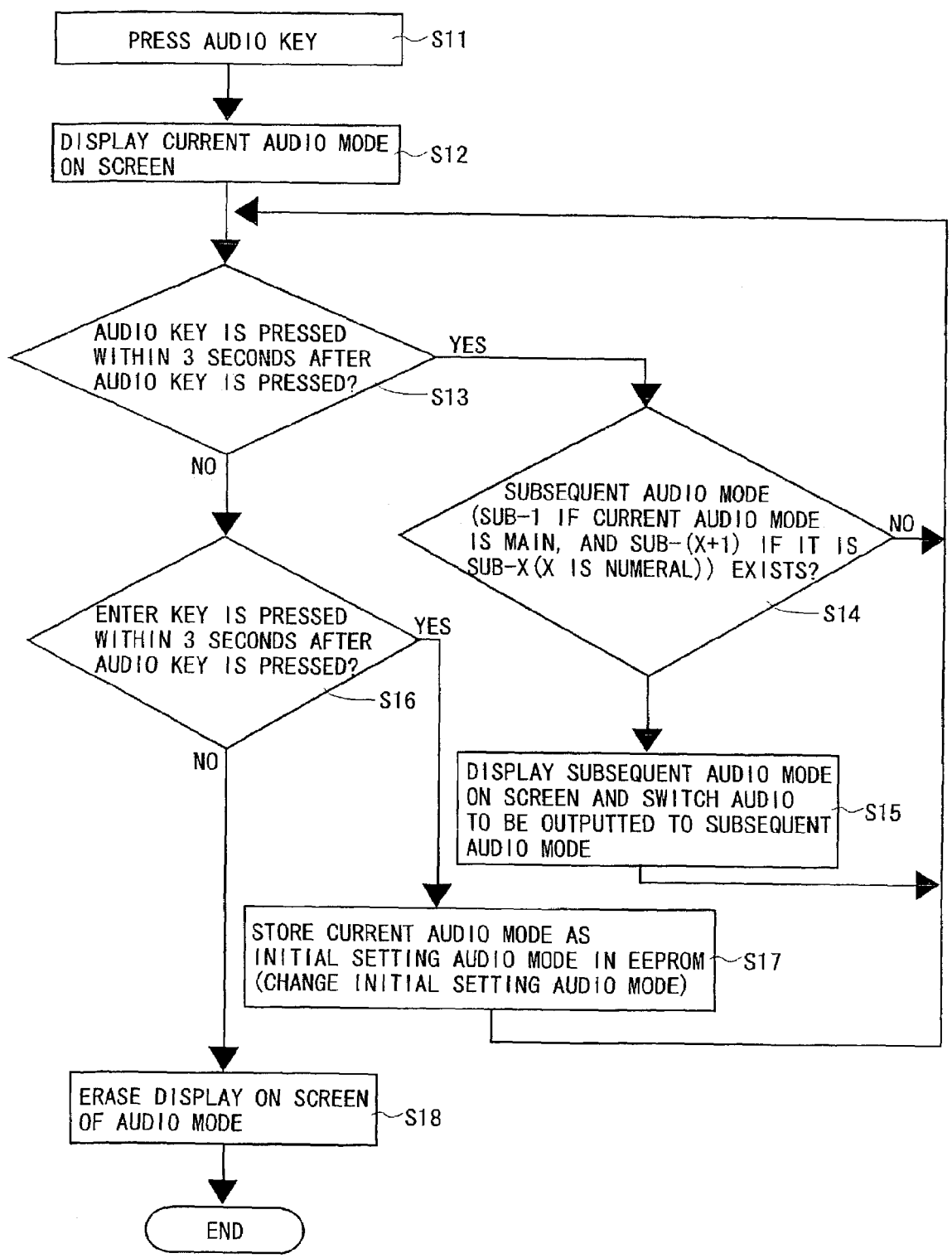
FIG. 5 is an illustration showing processing for changing an audio mode at the time of receiving digital broadcasting.
Figure 6:
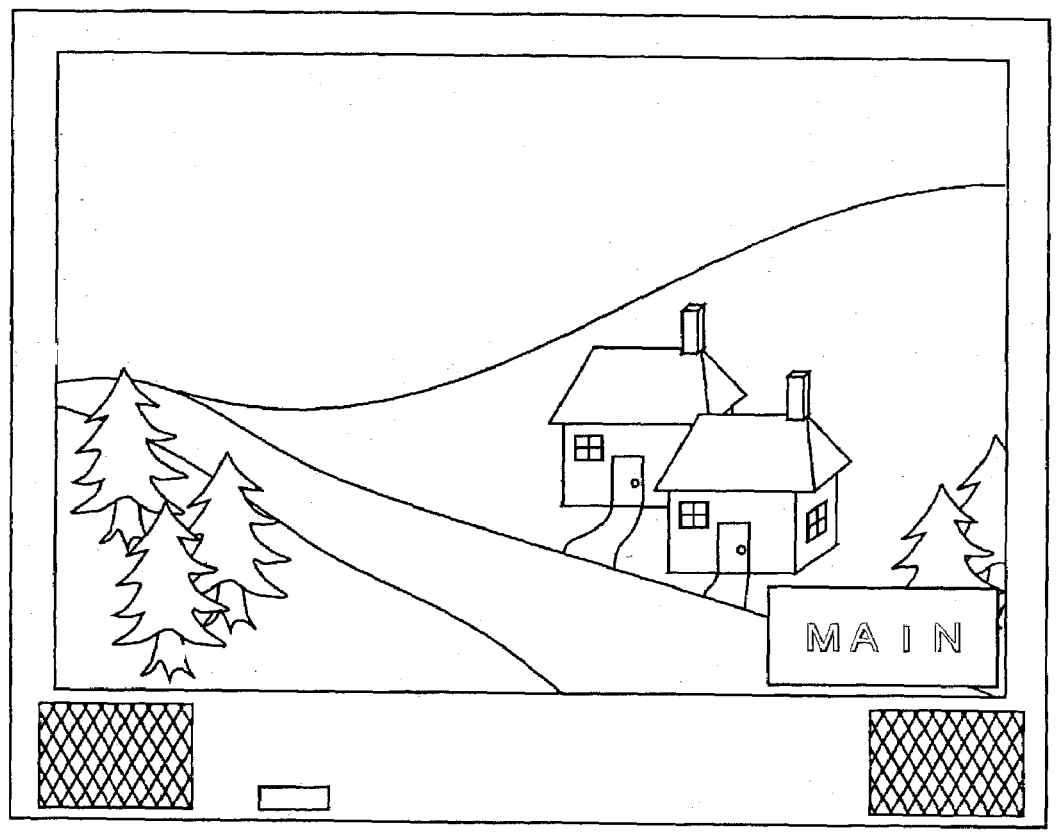
FIG. 6 is an illustration showing the display on a screen of an audio mode at the time of receiving digital broadcasting.

FIG. 5 is a flow chart showing audio mode switching processing performed by the CPTLs 13 and 15 when digital broadcasting is received. When the AUDIO key in the remote control transmitter 10 is pressed by the user (step S11), the current audio mode is displayed on the screen using the OSD circuit 12 (step S12). The displayed state is illustrated in FIG. 6, for example. When the AUDIO key is pressed again within three seconds after the AUDIO key is pressed (YES in step S13), the existence of the subsequent audio mode is judged circularly in such a manner that the audio mode passes through SUB, for example, SUB-1, SUB-2, SUB-3, . . . , MAIN if the current audio mode is MAIN.

If there is no subsequent audio mode (that is, when the number of audio modes is one) (NO in step S14), the state where the audio mode is displayed is maintained (returned to step S13). On the other hand, when the subsequent audio mode exists (YES in step S14), the subsequent audio mode is displayed on the screen, and an audio to be outputted is switched to the subsequent audio mode (step S15). The program is returned to the step S13.

When the answer is in the negative in the step S13, it is judged whether or not the ENTER key is pressed within three seconds after the AUDIO key is pressed (step S16). When the ENTER key is pressed (YES in step S16), the current audio mode is stored in the memory 14 as an initial setting audio mode (as a steady selection corresponding to setting on the menu screen) (step S17) The program is returned to the step S13. On the other hand, when the ENTER key is not pressed (NO in step S16), the display on the screen of the audio mode is erased (step S18), after which the program ends.

When the state where the audio mode is selected is determined through the step S17, the audio mode is treated as a steady audio mode. Even if the channel is changed, and TV is turned off, the basic mode is the audio mode. If the AUDIO key is operated by the user, a state where the audio mode is temporarily changed is formed while making the audio mode basic.

In a state where SUB-1, SUB-2, . . . , are temporarily or steadily selected as the audio mode, the program is changed (the channel is changed). When it is assumed that there are no SUB-1, SUB-2, . . . , in the program, the audio mode is automatically switched to MAIN. Further, when the program is switched to a program provided with SUB-1, SUB-2, . . . , again, processing for making SUB-1, SUB-2, . . . , effective may be performed.

Although in the above-mentioned embodiment, a time range for steadiness (initialization) of a state where the audio mode is selected (a time period during which the audio mode is displayed on the screen) by the ENTER key is set to three seconds, it is not limited to three seconds. Further, it need not be the same time period as the time period during which the audio mode is displayed on the screen. For example, a message screen "the current audio mode can be determined by pressing the ENTER key" may be presented for several seconds after an elapse of the time period during which the audio mode is displayed on the screen, for example, to make the operation of the ENTER key effective in the time period. When the state where the audio mode is selected is steadied (initialized) by the ENTER key, a message screen for informing the user of the fact that steadiness (initialization) is performed may be displayed. Although the broadcasting receiver capable of receiving both analog broadcasting and digital broadcasting is illustrated, the present invention is also applicable to a broadcasting receiver for receiving either one of analog broadcasting and digital broadcasting. On the other hand, the broadcasting receiver is so configured that it can receive both analog broadcasting and digital broadcasting in the above-mentioned embodiment, and the AUDIO key and the ENTER key are shared between the time of receiving digital broadcasting and the time of receiving analog broadcasting. Therefore, the broadcasting receiver is more convenient in use.

As described in the foregoing, according to the present invention, the temporary audio mode setting and the steady audio mode setting can be performed only by operating the first key and the second key without calling the menu screen, the effect of improving convenience in use is produced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a broadcasting receiver that receives a broadcasting wave and outputs at least an audio, a broadcasting receiver comprising:
    a first key for switching an audio mode in sound multiplex broadcasting; and
    a second key for determining various types of selections, setting information stored in a memory being changed such that when said second key is operated in a state where the audio mode is temporarily selected by operating said first key, the state where the audio mode is temporarily selected is treated as the steady selection corresponding to setting on a menu screen.

2. The broadcasting receiver according to claim 1, wherein
    when said second key is operated within a predetermined time period after said first key is operated, the state where the audio mode is temporarily selected is treated as the steady selection corresponding to the setting on the menu screen.

3. The broadcasting receiver according to claim 1, further comprising
    a digital broadcasting video generator for extracting a transport stream from a digital broadcasting wave and decoding the extracted transport stream, and
    an analog broadcasting video generator for outputting a signal demodulated from an analog broadcasting wave,
    said first key and said second key being shared between the time of receiving digital broadcasting and the time of receiving analog broadcasting.

4. The broadcasting receiver according to claim 2, further comprising
    a digital broadcasting video generator for extracting a transport stream from a digital broadcasting wave and decoding the extracted transport stream, and
    an analog broadcasting video generator for outputting a signal demodulated from an analog broadcasting wave,
    said first key and said second key being shared between the time of receiving digital broadcasting and the time of receiving analog broadcasting.

* * * * *